United States Patent
Upton

(10) Patent No.: US 6,974,169 B1
(45) Date of Patent: Dec. 13, 2005

(54) PULLING GRIP WITH SHROUD

(75) Inventor: Kenneth C. Upton, Reinholds, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/889,512

(22) Filed: Jul. 12, 2004

(51) Int. Cl.⁷ .............................. F16L 3/01; H02G 1/08
(52) U.S. Cl. ......... 294/86.42; 24/115 N; 254/134.3 FT
(58) Field of Search ............................. 294/1.1, 86.42; 254/134.3 FT, 134.3 R, 134.3 CL; 24/115 N, 24/122.3, 122.6; 385/136, 137

(56) References Cited

U.S. PATENT DOCUMENTS

| | | | | |
|---|---|---|---|---|
| 1,521,789 A | * | 1/1925 | Oswald | 294/86.42 |
| 2,434,358 A | * | 1/1948 | Frank | 439/788 |
| 2,766,501 A | * | 10/1956 | Loyal | 294/86.42 |
| 3,672,006 A | * | 6/1972 | Fidrych | 24/122.6 |
| 4,969,677 A | * | 11/1990 | Melegari | 294/86.42 |
| 5,029,816 A | | 7/1991 | Langston | 254/134.3 |
| 5,863,083 A | * | 1/1999 | Giebel et al. | 294/1.1 |
| 6,435,463 B1 | * | 8/2002 | Zezza | 248/322 |
| 6,648,520 B2 | | 11/2003 | McDonald et al. | 385/78 |

* cited by examiner

Primary Examiner—Dean J. Kramer
(74) Attorney, Agent, or Firm—Synnestvedt & Lechner, LLP

(57) ABSTRACT

A pulling grip for drawing a cable through a conduit is disclosed. The pulling grip includes a braided gripping sleeve that has an opening at one end which provides access to a central space surrounded by the sleeve. An eye for attachment to a pull tape is positioned at the opposite end of the gripping sleeve. The cable is received within the gripping sleeve, which is biased to engage and grip the cable along its length. Due to the trellis effect, the gripping sleeve grips the cable with greater force when under tension. One end of an elongated protective shroud is attached to the opposite end of the gripping sleeve. The other end of the shroud is free to move lengthwise along the sleeve toward and away from the attached end. The shroud prevents the gripping sleeve from contacting the conduit and its contents and thereby prevents the pulling grip from damaging these items during the pull.

21 Claims, 5 Drawing Sheets

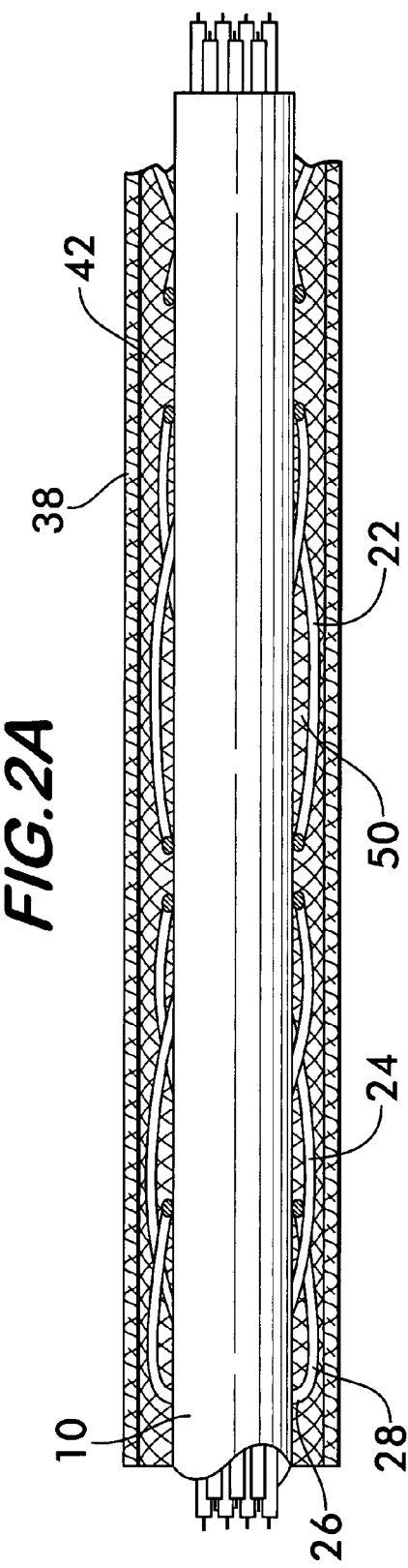
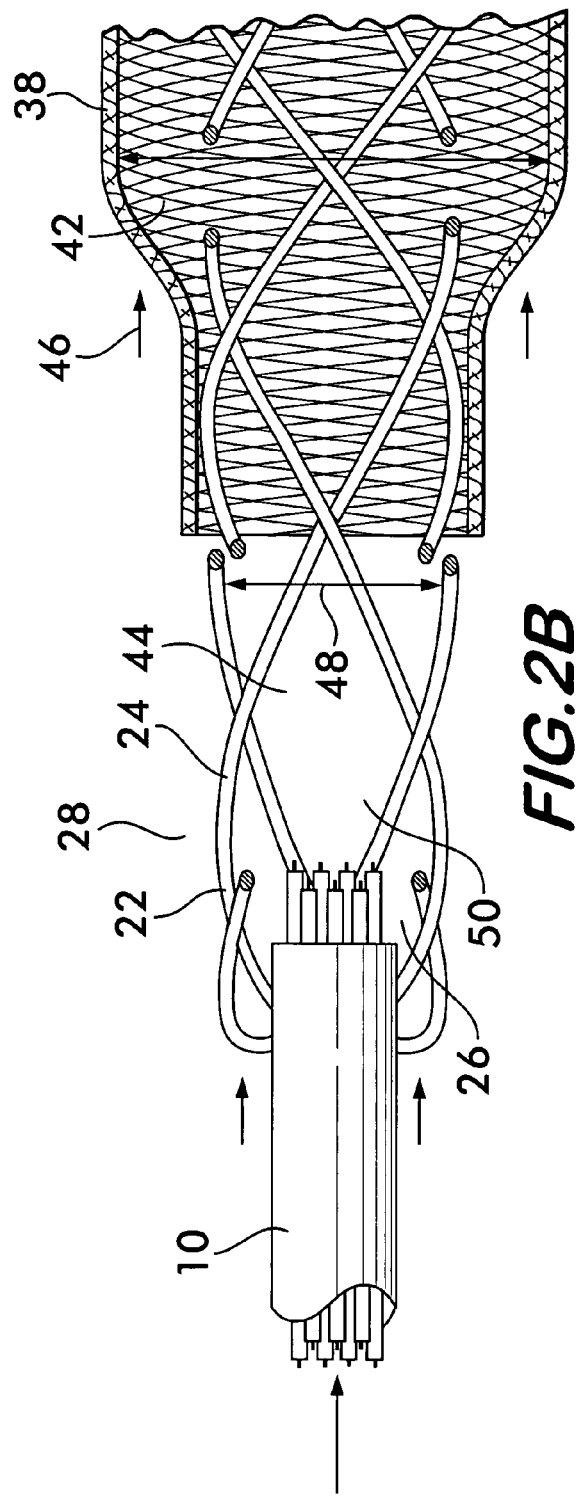

PULLING GRIP WITH SHROUD

FIELD OF THE INVENTION

The invention concerns devices such as kellems used to grip and pull elongated items such as electrical or fiber optic cables through ducts or conduits.

BACKGROUND OF THE INVENTION

Electrical and fiber optic cable is often laid within conduit for protection from the elements as well as from damage due to impact, cuts and abrasion. The conduits may be positioned underground and within buildings or other large structures and may extend over distances as long as a mile or more.

Typically, the interior of the conduit is accessible only at isolated end points. Therefore, to lay cable within a conduit, a lightweight pull tape is first blown though the conduit using compressed air or other known techniques. The pull tape extends from one end of the conduit to the other end. One end of the pull tape is then attached to the cable, and the pull tape is drawn out of the conduit from its other end, thereby drawing the cable through the conduit from one end to the other.

Because the lengths over which the cable is drawn may be long and tortuous, the pull tape and the cable may experience high tensile forces, largely due to the weight of the cable and the friction between the cable and the conduit. While the cable and the pull tape individually are designed to take such forces, attachment of the tape to the cable proves to be the weak link in the system.

To provide a means for attaching pull tape to cable, kellems were developed. A kellem comprises an elongated braided gripping sleeve, preferably made of high strength but flexible filamentary members. One end of the gripping sleeve has an eye that allows the pull tape to be tied to it. The other end has an opening allowing the cable to be received within the gripping sleeve. The gripping sleeve surrounds and grips the cable as described below, and allows the cable to be drawn through the conduit by the pull tape attached to the eye at its opposite end.

The filamentary members comprising the gripping sleeve of the kellem are resiliently biased so that, when the gripping sleeve is in a stress free, unconstrained state, the inner diameter of the gripping sleeve is smaller than the outer diameter of the cable. Because the gripping sleeve is braided, compressing the gripping sleeve lengthwise will expand the diameter radially outwardly, while tensioning the gripping sleeve will cause the diameter to contract radially inwardly. This characteristic is known as the "trellis effect" and is exhibited by braided structures.

Taking advantage of the trellis effect, the gripping sleeve is compressed lengthwise, expanding its inner diameter against the resilient biasing forces to a size that allows the cable to be inserted into the gripping sleeve. Once the cable is within the gripping sleeve, the compression force is removed, and the gripping sleeve contracts radially inwardly due to its resilient biasing and grips the cable. During the draw through the conduit, tensile force is applied to the gripping sleeve, causing it to contract further and grip the cable with greater force. Within limits, the more pulling force that is applied to the gripping sleeve, the greater gripping force will be exerted on the cable due to the trellis effect.

At the completion of the pull, the gripping sleeve is compressed lengthwise, expanding its diameter outwardly to release the gripping force on the cable, and the cable is removed from the gripping sleeve.

A disadvantage associated with the above-described kellem is the practice of covering it with a layer of tape, such as electrical tape. The tape is applied after the cable is inserted in the gripping sleeve to prevent the outer surface of the gripping sleeve from directly contacting the conduit, other cables or protective sleeves within the conduit. The surfaces of the filamentary members making up the kellem gripping sleeve tend to be sharp and rough and, if uncovered, the gripping sleeve can act like a saw, damaging or severing items with the conduit or even the conduit itself during the draw. Furthermore, the open mesh of the braid provides relatively large interstices that can snag items within the conduit.

Typically, large quantities of tape, on the order of about 20 feet or more, are required to fully cover a kellem of even modest length. The taping process is also very laborious in that it takes a lot of time to apply the tape before the pull as well as to remove the tape after the pull is completed. The tape is discarded after a pull.

There is clearly a need for a device that will eliminate the need to tape and untape kellems used to install cable in a conduit.

SUMMARY OF THE INVENTION

The invention concerns a pulling grip for drawing a cable through a conduit using a pull tape positioned within the conduit. The pulling grip comprises an elongated gripping sleeve formed of filamentary members braided together. The gripping sleeve surrounds a central space and has a first end that defines an opening providing access to the central space. The gripping sleeve has a second end positioned opposite to the first end on which an attachment eye is mounted. The attachment eye is adapted to receive the pull tape for drawing the pulling grip through the conduit.

An elongated tubular shroud substantially surrounds the gripping sleeve. One end of the shroud is attached to the second end of the gripping sleeve. A length of the shroud extends from the one end and is freely movable lengthwise relatively to the gripping sleeve.

The opening and the central space are adapted to receive the cable. Because it is a braided structure, the gripping sleeve is contractible radially inwardly upon application of a lengthwise tensile force thereto to forcibly engage and circumferentially grip the cable received within the central space. The gripping sleeve is also expandible radially outwardly upon application of a lengthwise compressive force thereto to disengage from and release the cable. The gripping sleeve is adapted to grip and pull the cable when the gripping sleeve is drawn from the eye.

Preferably, the shroud extends substantially along the entire length of the gripping sleeve. A ferrule is positioned at the second end of the gripping sleeve. The ferrule surrounds the shroud and the gripping sleeve and effects attachment of the shroud to the gripping sleeve at the second end.

Preferably, the shroud comprises a plurality of braided filamentary members.

A lubricious substrate, preferably a non-woven felt strip impregnated with a lubricant, may be interbraided with the filamentary members forming the shroud to provide lubricant facilitating the drawing of the pulling grip through the conduit.

The invention also includes a method of drawing a cable through a conduit with a pull tape. The method comprises the steps of:

(A) providing an elongated gripping sleeve formed of filamentary members braided together, the gripping sleeve surrounding a central space and having an opening at one end providing access to the central space;

(B) providing a shroud surrounding the gripping sleeve, the shroud being attached to an opposite end of the gripping sleeve;

(C) inserting the cable through the opening into the central space;

(D) attaching the pull tape to the opposite end of the gripping sleeve; and (E) drawing the pull tape, and thereby the gripping sleeve, through the conduit, the gripping sleeve contracting radially inwardly to engage and grip the cable and draw the cable along with the gripping sleeve through the conduit.

BRIEF DESCRIPTION OF THE DRAWINGS

FIG. 2A is a partial longitudinal sectional view of the pulling grip taken at line 2A—2A of FIG. 1;

FIG. 2B is a partial longitudinal sectional view of the pulling grip shown in FIG. 1;

DETAILED DESCRIPTION OF THE PREFERRED EMBODIMENTS

Figure 1:
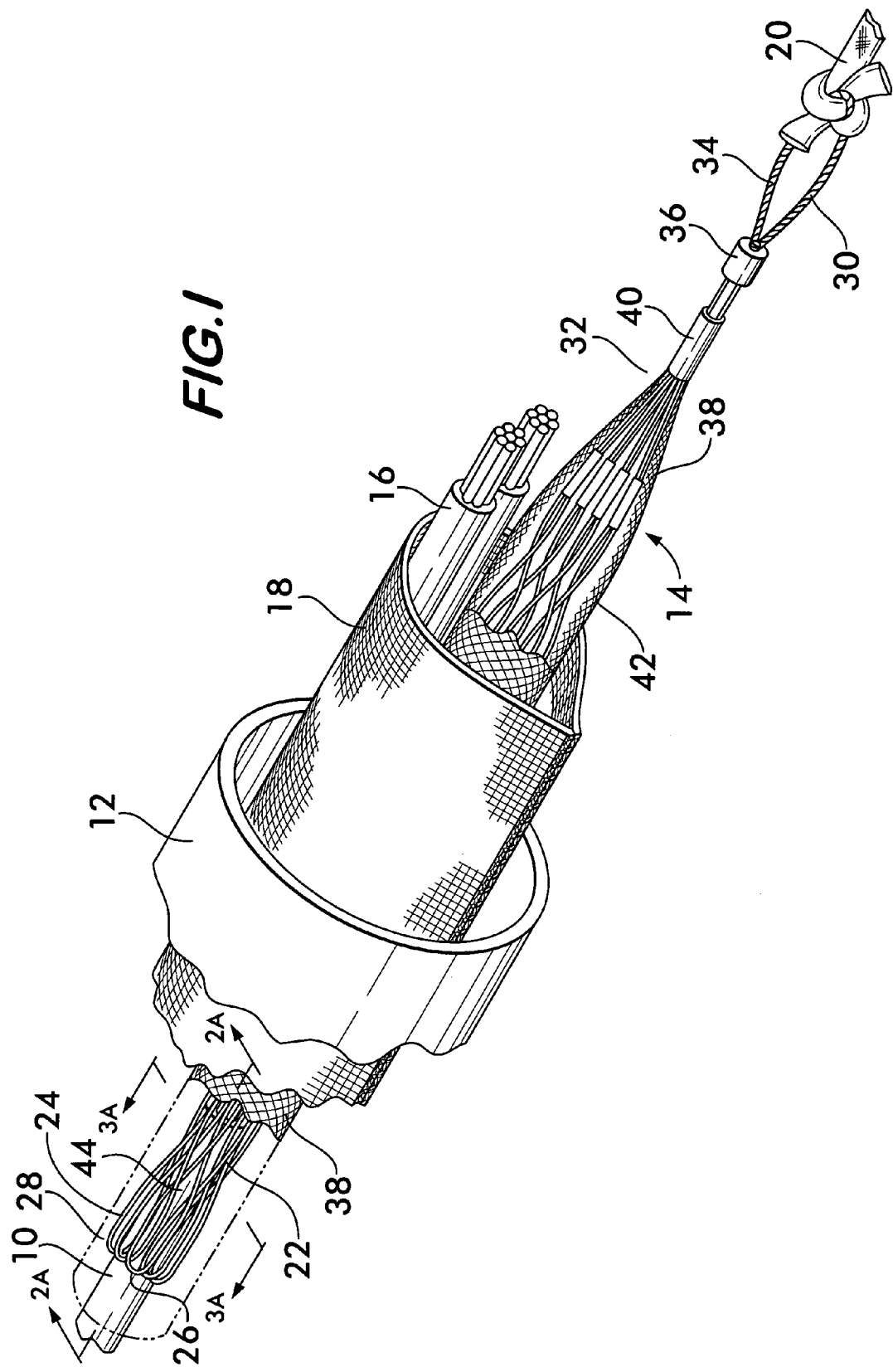
FIG. 1 is a partial perspective view of a pulling grip according to the invention traversing a conduit.

FIG. 1 shows a cable 10 being drawn through a conduit 12 using a pulling grip 14 according to the invention. Additional cables 16 are present within the conduit 12, preferably positioned within a protective sleeve 18 that is pre-positioned within the conduit with a pull tape 20.

Pulling grip 14 comprises a flexible elongated gripping sleeve 22 formed of a plurality of filamentary members 24 braided together. Preferably, the filamentary members 24 are twisted steel cable for high strength and resiliency, the cable being preferably galvanized to inhibit corrosion. Other metals as well as non-metals are also feasible. Gripping sleeve 22 has an opening 26 at one end 28, the opening adapted to receive the cable 10 within the sleeve. An eye 30 is mounted on the gripping sleeve 22 at its opposite end 32. Eye 30 is preferably a loop 34 of twisted galvanized steel cable that is attached to the gripping sleeve using a swaged fitting 36. Pull tape 20 is tied to the loop 34 to draw the pulling grip 14 through the protective sleeve 18 within the conduit 12.

Figure 5:
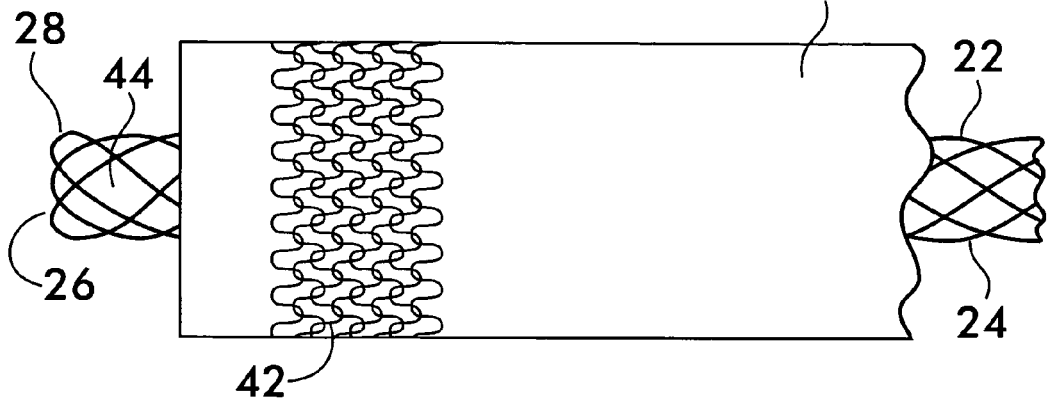
FIGS. 5–7 are partial side views of alternate embodiments of pulling grips according to the invention.
Figure 6:
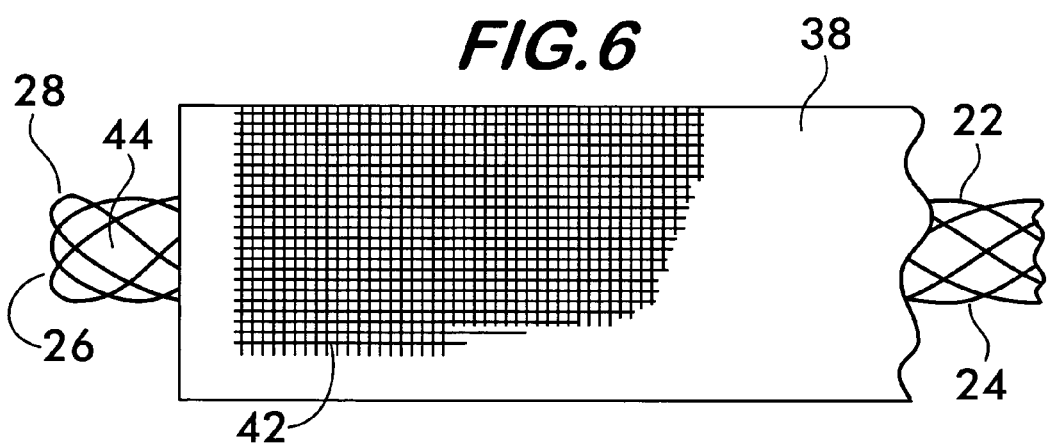
Figure 7:
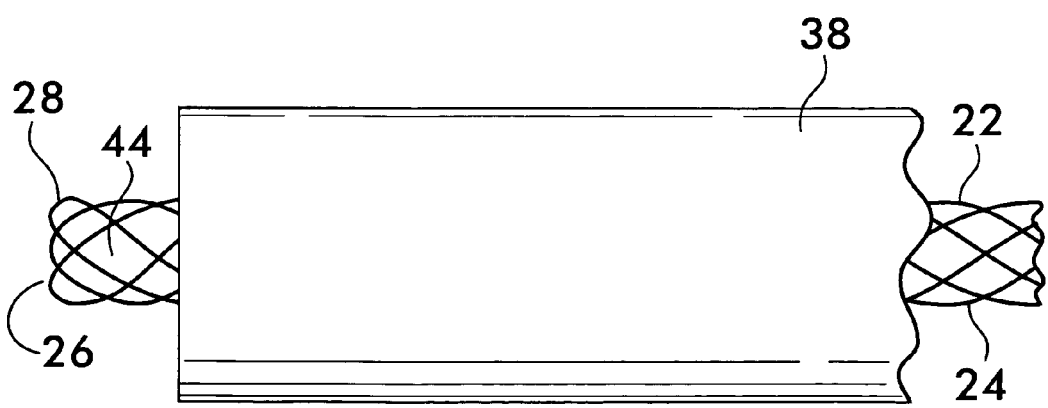

An elongated tubular shroud 38 substantially surrounds the gripping sleeve 22. One end of the shroud 38 is attached to the end 32 of the gripping sleeve 22. Attachment of the shroud is preferably effected by means of a ferrule 40 which surrounds and cinches the shroud 38 to the gripping sleeve 22. The remainder of the shroud is unattached and is free to move lengthwise along gripping sleeve 22 toward and away from end 32. Preferably, the shroud 38 is braided from filamentary members 42 made of a polymer such as polyester, nylon or polypropylene. Braiding is preferred because it permits great flexibility, allowing the shroud 38 to slide lengthwise along the gripping sleeve to facilitate insertion of the cable 10 into the sleeve as explained below. The shroud 38 may also be knitted, as shown in FIG. 5, or woven, as shown in FIG. 6, or may be formed from a substantially continuous membrane, such as expanded polytetrafluoroethylene, as shown in FIG. 7.

Shroud 38 covers the gripping sleeve 22 as it is pulled through the conduit 12, either within a protective sleeve 18 as shown in FIG. 1, or within the conduit outside of the protective sleeve. The shroud prevents direct contact between the filamentary members 24 and the conduit 12 as well as the items within the conduit, such as protective sleeve 18 or other cables 16. The filamentary members 24, being preferably formed of twisted steel cable for strength and resilience, present sharp and rough edges and surfaces. Such surfaces are advantageous for gripping cable 10, but unless they are covered by an intervening layer, such as provided by shroud 38, the exposed filamentary members 24 can abrade, cut, sever or otherwise damage the conduit 12, protective sleeve 18 and other cables 16 through sliding contact with these items as the gripping sleeve 22 is drawn through the conduit. Furthermore, the filamentary members 24 are preferably braided with an open mesh that produces relatively large interstices 44. While the open mesh provides great flexibility, allowing the gripping sleeve 22 to be readily compressed to facilitate insertion of cable 10 (explained below) or bent to negotiate right angle bends of the conduit, the large interstices 44 tend to snag items within the conduit. This can greatly increase the force required during the draw and may also result in damage to items within the conduit unless the interstices are covered.

Use of the pulling grip 14 is illustrated in FIGS. 1, 2A, 2B, 3A and 3B. As shown in FIG. 2B, the shroud 38 is moved in the direction of arrows 46 away from the opening 26 in the end of gripping sleeve 22. A braided shroud 38 of polymer monofilaments is advantageous here because, due to the excellent flexibility of the braid, it can be compressed easily, and even turned inside out to expose the gripping sleeve 22 without bunching or kinking.

Next the gripping sleeve 22 is compressed in the direction of arrows 46. As stated above, due to the trellis effect, compression of the gripping sleeve causes it to expand radially outwardly as indicated by arrow 48 in FIG. 2B and illustrated in FIG. 3B. This compression increases the sleeve's inner diameter, which is biased to normally assume a diameter smaller than the outer diameter of cable 10. As shown in FIGS. 2B and 3B, cable 10 may then be inserted through opening 26 and into the central space 50 surrounded and defined by the gripping sleeve 22. The cable 10 is inserted far enough so that there is an adequate engagement length between the gripping sleeve 22 and the cable 10 to ensure that the cable does not slip out of the sleeve when under tension.

Figure 3A:
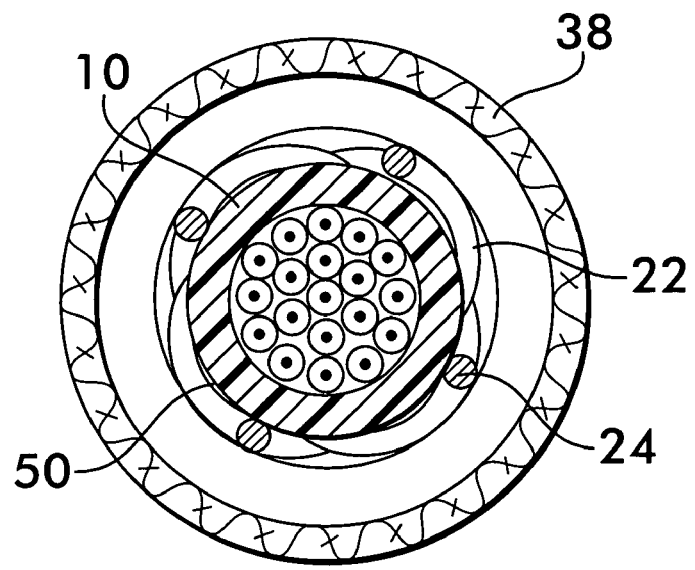
FIG. 3A is a cross-sectional view of the pulling grip taken at line 3A—3A of FIG. 1.
Figure 3B:
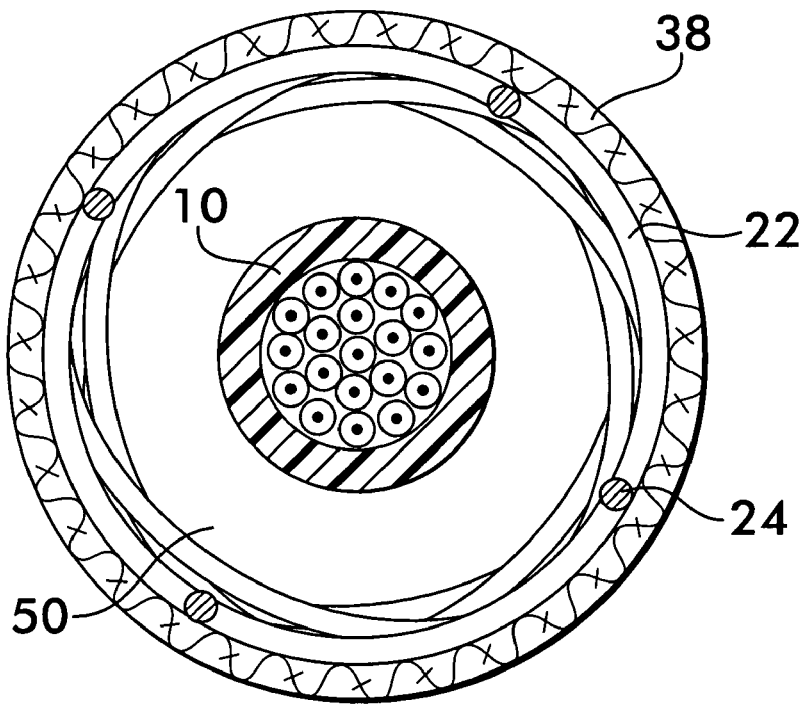
FIG. 3B is a cross-sectional view of the pulling grip shown in FIG. 1.

As shown in FIGS. 2A and 3A, the compression force is removed from the gripping sleeve 22 and the sleeve contracts radially and lengthens under its resilient biasing force to engage the cable 10. The biasing of gripping sleeve 22 to a diameter smaller than the outer diameter of cable 10 provides for an initial degree of radial compression force on the cable by the gripping sleeve.

Figure 4:
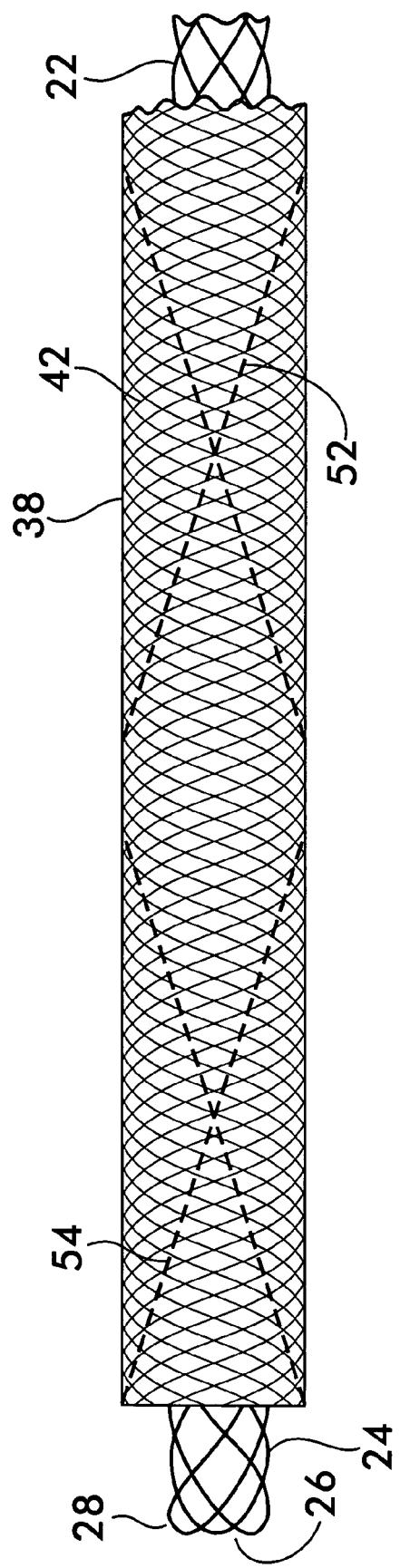
FIG. 4 is a partial side view of the pulling grip shown in FIG. 1.

With the cable 10 firmly gripped by the gripping sleeve 22, the shroud 38 is moved back over the sleeve as shown in FIG. 1. Preferably, the shroud 38 covers the gripping sleeve 22 over its entire length to prevent any detrimental contact between it and the conduit or its contents. The pull tape 20 is attached to eye 30 and the opposite end of the pull tape is drawn through the conduit 12. Tension applied to the gripping sleeve 22 during the pull serves to tighten its grip on the cable 10 due to the trellis effect for braided structures. The shroud 38 prevents direct contact between the gripping sleeve 22 and the conduit 12 and its contents, thus preventing abrasion, cuts or other damage from occurring. By making the shroud from polymers with a low coefficient of friction, it is possible to reduce the force required to effect the pull. Friction between the shroud 38 and other items such as cables 16 and protective sleeve 18 may be reduced further by incorporating lubricious substrates 52 within the shroud, as illustrated in FIG. 4. Preferably, the substrates 52 comprise non-woven felt strips 54 interlaced with the filamentary members 42 forming the shroud. Felt strips 54 are impregnated with a lubricant, such as polywater or other silicone based lubricants, which exudes from the strips to lubricate the pulling grip 14 as it traverses the conduit 12, for example, within the protective sleeve 18.

At the conclusion of the pull, the shroud 38 is again moved away from opening 26, the gripping sleeve 22 is compressed to expand its inner diameter and release cable 10, which is then removed from central space 50. The pulling grip 14 may then be reused for installing other cables within conduit.

Pulling grips according to the invention provide a distinct advantage over prior art devices used to pull cable in that they provide a device that can traverse a conduit under significant tension without damaging the conduit or other items positioned within it, while avoiding the expense and wasted time and material associated with the preparation of prior art devices by wrapping them with tape.

What is claimed is:

1. A pulling grip for drawing cable, said pulling grip comprising:
    an elongated gripping sleeve formed of filamentary members braided together, said gripping sleeve surrounding a central space and having a first end defining an opening providing access to said central space, said gripping sleeve having a second end positioned opposite to said first end;
    an elongated tubular shroud substantially surrounding said gripping sleeves;
    a ferrule positioned at said second end of said gripping sleeve, said ferrule surrounding said shroud and said gripping sleeve and effecting attachment of one end of said shroud to said second end of said gripping sleeve, another end of said shroud being movable lengthwise along said gripping sleeve toward and away from said second end thereof; and
    wherein said opening and said central space are adapted to receive said cable, said gripping sleeve being contractible radially inwardly upon application of a lengthwise tensile force thereto to forcibly engage and circumferentially grip said cable received within said central space, said gripping sleeve being expandable radially outwardly upon application of a lengthwise compressive force thereto to disengage from and release said cable, said gripping sleeve being adapted to grip and pull said cable when said gripping sleeve is drawn from said second end.

2. A pulling grip according to claim 1, wherein said shroud extends substantially along the entire length of said gripping sleeve.

3. A pulling grip according to claim 1, wherein said shroud comprises a plurality of interlaced filamentary members.

4. A pulling grip according to claim 3, wherein said filamentary members forming said shroud are interlaced by the technique selected from the group consisting of braiding, knitting and weaving.

5. A pulling grip according to claim 3, wherein said filamentary members forming said shroud comprise monofilaments.

6. A pulling grip according to claim 3, wherein said filamentary members forming said shroud comprise a polymer material.

7. A pulling grip according to claim 3, further comprising a lubricious substrate interlaced with said filamentary members forming said shroud.

8. A pulling grip according to claim 7, wherein said lubricious substrate comprises a non-woven felt strip impregnated with a lubricant.

9. A pulling grip according to claim 1, wherein said shroud comprises a substantially continuous membrane.

10. A pulling grip according to claim 9, wherein said membrane comprises expanded polytetrafluoroethylene.

11. A pulling grip for drawing a cable through a conduit using a pull tape positioned within said conduit, said pulling grip comprising:
    an elongated gripping sleeve formed of filamentary members braided together, said gripping sleeve surrounding a central space and having a first end defining an opening providing access to said central space, said gripping sleeve having a second end positioned opposite to said first end;
    an attachment eye mounted on said second end of said gripping sleeve and adapted to receive said pull tape;
    an elongated tubular shroud substantially surrounding said gripping sleeve, one end of said shroud being attached to said second end of said gripping sleeve, a length of said shroud extending from said one end being freely movable lengthwise relatively to said gripping sleeve; and
    wherein said opening and said central space are adapted to receive said cable, said gripping sleeve being contractible radially inwardly upon application of a lengthwise tensile force thereto to forcibly engage and circumferentially grip said cable received within said central space, said gripping sleeve being expandable radially outwardly upon application of a lengthwise compressive force thereto to disengage from and release said cable, said gripping sleeve being adapted to grip and pull said cable when said gripping sleeve is drawn from said eye.

12. A pulling grip according to claim 11, wherein said shroud extends substantially along the entire length of said gripping sleeve.

13. A pulling grip according to claim 11, further comprising a ferrule positioned at said second end of said gripping sleeve, said ferrule surrounding said shroud and said gripping sleeve and effecting attachment of said shroud to said gripping sleeve at said second end.

14. A pulling grip according to claim 11, wherein said shroud comprises a plurality of interlaced filamentary members.

15. A pulling grip according to claim 14, wherein said filamentary members forming said shroud are interlaced by braiding.

16. A pulling grip according to claim 14, wherein said filamentary members forming said shroud comprise monofilaments.

17. A pulling grip according to claim 14, wherein said filamentary members forming said shroud comprise a polymer material.

18. A pulling grip according to claim 11, further comprising a lubricious substrate interlaced with said filamentary members forming said shroud.

19. A pulling grip according to claim 18, wherein said lubricious substrate comprises a non-woven felt strip impregnated with a lubricant.

20. A method of drawing a cable through a conduit with a pull tape, said method comprising the steps of:
- providing an elongated gripping sleeve formed of filamentary members braided together, said gripping sleeve surrounding a central space and having an opening at one end providing access to said central space;
- providing a shroud surrounding said gripping sleeve, said shroud being attached to an opposite end of said gripping sleeve;
- inserting said cable through said opening into said central space;
- attaching said pull tape to said opposite end of said gripping sleeve; and
- drawing said pull tape, and thereby said gripping sleeve, through said conduit, said gripping sleeve contracting radially inwardly to engage and grip said cable and draw said cable along with said gripping sleeve through said conduit.

21. A method according to claim 20, further comprising the steps of lubricating said shroud to facilitate passage through said conduit.

* * * * *